No. 799,419. PATENTED SEPT. 12, 1905.
W. S. TICHENOR.
TROLLEY.
APPLICATION FILED FEB. 4, 1905.

WITNESSES:
N. C. Abbott
C. R. Ferguson

INVENTOR
William S. Tichenor
BY
Munn
ATTORNEYS

UNITED STATES PATENT OFFICE.

WILLIAM S. TICHENOR, OF OWENSVILLE, INDIANA.

TROLLEY.

No. 799,419.      Specification of Letters Patent.      Patented Sept. 12, 1905.

Application filed February 4, 1905. Serial No. 244,111.

*To all whom it may concern:*

Be it known that I, WILLIAM S. TICHENOR, a citizen of the United States, and a resident of Owensville, in the county of Gibson and State of Indiana, have invented a new and Improved Trolley, of which the following is a full, clear, and exact description.

This invention relates to improvements in trolleys for overhead electric-railway systems, the object being to provide a trolley of simple and inexpensive construction and having shaft-bearings that are practically dirt and dust proof.

Other objects of the invention will appear in the general description.

I will describe a trolley embodying my invention and then point out the novel features in the appended claims.

Reference is to be had to the accompanying drawings, forming a part of this specification, in which similar characters of reference indicate corresponding parts in all the figures.

Figure 1:
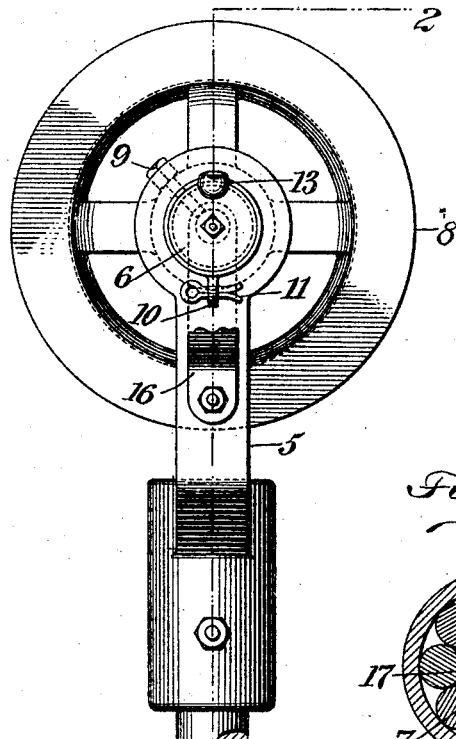
Figure 3:
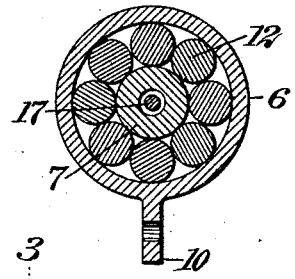
Figure 2:
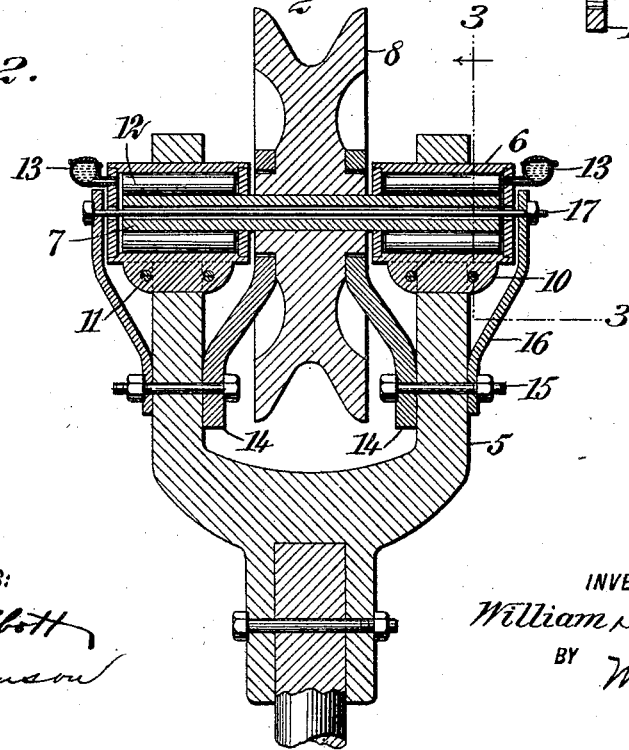

Figure 1 is a side elevation of a trolley embodying my invention. Fig. 2 is a section on the line 2 2 of Fig. 1, and Fig. 3 is a section on the line 3 3 of Fig. 2.

Referring to the drawings, 5 designates the trolley-harp removably secured in openings, in the members of which are bearing-boxes 6 for the tubular shaft 7, on which the trolley 8 is secured, as here shown by means of a lag-screw 9. The boxes 6 have removable ends, and they are detachably connected to the members of the harp. As a means for attaching the bearing-boxes to the harp they are provided with web portions 10, which engage in slots formed in the harp members to communicate with openings, and passing through openings in said web portions at the opposite sides of the harp members are cotters 11. The tubular shaft 7 has its bearings in antifriction-rollers 12, arranged in the bearing-boxes, and oil is supplied to the bearings from oil-cups 13.

The current is carried from the trolley 8 through the harp by brushes 14, which engage around the hub of the trolley and are secured to the harp members by means of bolts 15. Also secured to the harp members at the outer sides and by means of the bolts 15 are guard-plates 16, which are engaged at their upper ends by means of a bolt 17 passing through the tubular shaft 7. These guard-plates will prevent the conductor-wire from engaging with the bearing-boxes should the trolley slip from the wire.

Having thus described my invention, I claim as new and desire to secure by Letters Patent—

1. A trolley-harp having openings and slots in its members, said slots communicating with the openings, bearing-boxes for engaging in the openings and having web portions for engaging in the slots, devices passing through said webs for holding the boxes in place, antifriction devices in the boxes, and a trolley having its shaft-bearings on said antifriction devices.

2. A trolley-harp, bearing-boxes arranged in the members thereof, a trolley, a shaft on which the trolley is mounted and extended into said boxes, the said shaft being tubular, guard-plates extended upward from the outer sides of the harp members, and a bolt connecting the upper ends of said guard-plates, said bolt being passed through the tubular shaft.

In testimony whereof I have signed my name to this specification in the presence of two subscribing witnesses.

WILLIAM S. TICHENOR.

Witnesses:
  L. F. WELDON,
  WILL MAY.